(12) United States Patent
Xie et al.

(10) Patent No.: US 11,095,478 B2
(45) Date of Patent: Aug. 17, 2021

(54) ACCESS CONTROL METHOD, APPARATUS, AND SYSTEM

(71) Applicant: HUAWEI TECHNOLOGIES CO., LTD., Shenzhen (CN)

(72) Inventors: Ying Xie, Nanjing (CN); Xin Wang, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 135 days.

(21) Appl. No.: 16/109,801

(22) Filed: Aug. 23, 2018

(65) Prior Publication Data
US 2019/0013968 A1    Jan. 10, 2019

Related U.S. Application Data

(63) Continuation of application No. PCT/CN2017/072904, filed on Feb. 24, 2017.

(30) Foreign Application Priority Data

Feb. 23, 2016 (CN) .......................... 201610100415.5

(51) Int. Cl.
*H04L 12/46* (2006.01)
*H04L 29/06* (2006.01)
*H04L 12/741* (2013.01)

(52) U.S. Cl.
CPC .......... *H04L 12/4641* (2013.01); *H04L 45/74* (2013.01); *H04L 63/08* (2013.01);
(Continued)

(58) Field of Classification Search
CPC ..... H04L 12/4641; H04L 63/10; H04L 63/08; H04L 45/74; H04L 63/0876; H04L 63/0884; H04L 63/102
See application file for complete search history.

(56) References Cited

U.S. PATENT DOCUMENTS 7,562,384 B1 * 7/2009 Huang ................. H04L 63/164
  713/170
7,653,813 B2 * 1/2010 Venkitaraman ..... H04L 61/2092
  713/169
(Continued)

FOREIGN PATENT DOCUMENTS

CN    101043331 A    9/2007
CN    101436934 A    5/2009
(Continued)

OTHER PUBLICATIONS

M. Mahalingam et al, Virtual eXtensible Local Area Network (VXLAN): A Framework for Overlaying Virtualized Layer 2 Networks over Layer 3 Networks. RFC7348, Aug. 2014, 22 pages.

*Primary Examiner* — Farid Homayounmehr
*Assistant Examiner* — Suman Debnath
(74) *Attorney, Agent, or Firm* — Maier & Maier, PLLC

(57) ABSTRACT

The present invention discloses an access control method, apparatus, and system, and belongs to the communications field. The method includes: receiving a virtual extensible local area network VXLAN request packet sent by an access device; parsing the VXLAN request packet to obtain an IP address of the access device and authentication information of a user; sending the IP address of the access device and the authentication information of the user to an authentication server, so that the authentication server authenticates the user; receiving an authentication result sent by the authentication server; and controlling the user according to the authentication result. According to the present invention, the user is authenticated according to access information of the user in a VXLAN scenario.

17 Claims, 8 Drawing Sheets

(52) U.S. Cl.
CPC ...... *H04L 63/0876* (2013.01); *H04L 63/0884* (2013.01); *H04L 63/10* (2013.01); *H04L 63/102* (2013.01)

(56) References Cited

U.S. PATENT DOCUMENTS

| | | | |
|---|---|---|---|
| 2005/0185633 A1* | 8/2005 | Shigei | H04L 41/5077 |
| | | | 370/352 |
| 2013/0304917 A1 | 11/2013 | Mittal et al. | |
| 2013/0332982 A1* | 12/2013 | Rao | H04L 63/08 |
| | | | 726/1 |
| 2014/0215066 A1* | 7/2014 | Kamat | H04L 67/146 |
| | | | 709/225 |
| 2014/0280846 A1 | 9/2014 | Gourlay et al. | |
| 2015/0124587 A1* | 5/2015 | Pani | H04L 41/12 |
| | | | 370/221 |
| 2015/0200808 A1 | 7/2015 | Gourlay et al. | |
| 2016/0036771 A1 | 2/2016 | Yadav et al. | |
| 2016/0149808 A1* | 5/2016 | Cai | H04L 12/4633 |
| | | | 370/395.53 |

FOREIGN PATENT DOCUMENTS

| | | |
|---|---|---|
| CN | 101739906 A | 7/2010 |
| CN | 102255916 A | 11/2011 |
| CN | 102857517 A | 1/2013 |
| CN | 103209159 A | 7/2013 |

* cited by examiner

ACCESS CONTROL METHOD, APPARATUS, AND SYSTEM

CROSS-REFERENCE TO RELATED APPLICATIONS

This application is a continuation of International Application No. PCT/CN2017/072904, filed on Feb. 4, 2017, which claims priority to Chinese Patent Application No. 201610100415.5, filed on Feb. 23, 2016. The disclosures of the aforementioned applications are hereby incorporated by reference in their entireties.

TECHNICAL FIELD

The present invention relates to the communications field, and in particular, to an access control method, apparatus, and system.

BACKGROUND

Development of communications technologies is accompanied with emergence of a virtual extensible local area network (VXLAN). The VXLAN is a network virtualization technology in network virtualization over layer 3 (NVO3). A data packet sent by a virtual machine (VM) or a physical server is encapsulated into a User Datagram Protocol (UDP) packet by using an Internet Protocol (IP) address or a Media Access Control (MAC) address of a physical network as a packet header, and then transmitted in an IP network. After the packet arrives at a destination, a tunnel endpoint decapsulates the packet and sends data to a target VM or physical server. That is, a user can communicate with a peer user in another network by using the VXLAN. As shown in FIG. 1, a VXLAN includes an access device 01 and a service router (SR) 02. Both the access device 01 and the SR 02 are edge devices of the VXLAN, and referred to as network virtualization edges (NVE). A VXLAN tunnel endpoint (VTEP) is disposed on each NVE.

In a conventional campus access or metropolitan Ethernet broadband access scenario, the SR 02 needs to authenticate, charge, and authorize a user according to physical location information of the user, and needs to perform security binding check on an IP service packet of the user after the user gets online. Specifically, the access device 01 adds, into a Dynamic Host Configuration Protocol (DHCP) packet, a DHCP option 82 that carries the physical location information of the user or adds, into a PPP Protocol over Ethernet (PPPoE) packet, a PPPoE+ option that carries access information (for example, a physical location or a loop identifier) of the user, and sends the DHCP packet or the PPPoE packet to the SR 02. Then the SR 02 sends, to an authentication server 1 for user authentication, one or more of the following information carried in the DHCP packet or the PPPoE packet: the physical location information of the user, a user name and/or a password, a virtual local area network (VLAN) identifier, or a port used by the SR to receive the DHCP packet or the PPPoE packet. The user can access a network only after being authenticated.

However, in a VXLAN network, an access device in which a VTEP is configured sends, in an equal-cost multi-path routing (ECMP) manner, a VXLAN packet to an SR in which a VTEP is disposed. As a result, a port actually used by the SR to receive the VXLAN packet cannot be determined. Therefore, information used for authentication cannot be pre-configured in an authentication server, and accordingly, a user cannot be authenticated according to access information of the user in a VXLAN scenario.

SUMMARY

To resolve a problem that a user cannot be authenticated according to access information of the user in a VXLAN scenario, the present invention provides an access control method, apparatus, and system. The technical solutions are as follows:

According to a first aspect, an access control method is provided, applied to a service router in a virtual extensible local area network VXLAN, and the method includes:

receiving a VXLAN request packet sent by an access device, where the VXLAN request packet is obtained by encapsulating an Internet Protocol IP request packet sent by a user, and the VXLAN request packet includes an IP address of the access device and authentication information of the user;

parsing the VXLAN request packet to obtain the IP address of the access device and the authentication information of the user;

sending the IP address of the access device and the authentication information of the user to an authentication server, so that the authentication server authenticates the user;

receiving an authentication result sent by the authentication server; and controlling the user according to the authentication result.

The access device encapsulates the IP request packet sent by the user, to obtain the VXLAN request packet, and sends the VXLAN request packet to the service router. The service router parses the VXLAN request packet to obtain the IP address of the access device and the authentication information of the user, and then sends the IP address of the access device and the authentication information of the user to the authentication server for user authentication. Because each user corresponds to a unique access device in the VXLAN, the IP address of the access device corresponding to the user and the authentication information of the user that are used for authentication can be pre-configured in the authentication server, so as to authenticate the user according to access information of the user in a VXLAN scenario.

Further, in a process of user authentication in a VLAN, an access device needs to add a DHCP option 82 or a PPPoE+ option into an IP request packet to determine physical location information of a user, and therefore, the process of user authentication is relatively complex. In the present invention, in an authentication process, the access device directly encapsulates the IP request packet sent by the user, the VXLAN request packet includes the IP address of the access device, and the IP address of the access device can indirectly reflect physical location information of the user. Therefore, the process of user authentication in the present invention is relatively simple.

In the prior art, because a user name and a password can be tampered with by the user, reliability of user authentication is relatively low. In the present invention, the IP address of the access device is authenticated, and because an outer source IP address in the VXLAN request packet is added by the access device and cannot be tampered with by the user, reliability of user authentication is relatively high.

Optionally, the controlling the user according to the authentication result includes:

when the authentication result indicates that authentication succeeds, allowing the user to access a network; or when the authentication result indicates that authentication fails, forbidding the user to access a network.

Optionally, the method further includes:

when the authentication result indicates that authentication succeeds, generating a local authentication binding entry according to the authentication result, where the local authentication binding entry includes the IP address of the access device and the authentication information of the user.

Optionally, the method further includes:

receiving a VXLAN service packet, where the VXLAN service packet is obtained by encapsulating an IP service packet sent by the user;

parsing the VXLAN service packet to obtain the IP service packet and an outer source IP address that is in a VXLAN header of the VXLAN service packet; and processing the IP service packet according to the local authentication binding entry.

Optionally, the processing the IP service packet according to the local authentication binding entry includes:

forwarding the IP service packet when the outer source IP address is the same as the IP address of the access device that is recorded in the local authentication binding entry; or forbidding forwarding of the IP service packet when the outer source IP address is different from the IP address of the access device that is recorded in the local authentication binding entry.

Further, when the authentication result indicates that authentication succeeds, the local authentication binding entry that includes the IP address of the access device and the authentication information of the user is generated according to the authentication result, so that after receiving the VXLAN service packet, the service router parses the VXLAN service packet to obtain the IP service packet and the outer source IP address (that is, the IP address of the access device that encapsulates the IP service packet) in the VXLAN service packet, and processes the IP service packet according to the local authentication binding entry. That is, whether the IP service packet is secure is determined by determining whether the outer source IP address is the same as the IP address of the access device that is recorded in the local authentication binding entry. When the outer source IP address is the same as the IP address of the access device that is recorded in the local authentication binding entry, the IP service packet is secure, and the IP service packet is forwarded. When the outer source IP address is different from the IP address of the access device that is recorded in the local authentication binding entry, the IP service packet is insecure, and forwarding of the IP service packet is forbidden. In this way, network security is ensured. In addition, because the outer source IP address in the VXLAN service packet is added by the access device and cannot be tampered with by the user, reliability of security binding check is relatively high.

Optionally, the sending the IP address of the access device and the authentication information of the user to an authentication server includes:

generating an authentication packet that includes the IP address of the access device and the authentication information of the user; and sending the authentication packet to the authentication server.

Optionally, the authentication server is a remote authentication dial-in user service RADIUS server, and an attribute 87 field of the authentication packet includes the IP address of the access device.

According to a second aspect, an access control apparatus is provided, applied to a virtual extensible local area network VXLAN, and the access control apparatus includes:

a first receiving module, configured to receive a VXLAN request packet sent by an access device, where the VXLAN request packet is obtained by encapsulating an Internet Protocol IP request packet sent by a user, and the VXLAN request packet includes an IP address of the access device and authentication information of the user;

a first parsing module, configured to parse the VXLAN request packet to obtain the IP address of the access device and the authentication information of the user;

a sending module, configured to send the IP address of the access device and the authentication information of the user to an authentication server, so that the authentication server authenticates the user;

a second receiving module, configured to receive an authentication result sent by the authentication server; and a control module, configured to control the user according to the authentication result.

Optionally, the control module is further configured to:

when the authentication result indicates that authentication succeeds, allow the user to access a network; or when the authentication result indicates that authentication fails, forbid the user to access a network.

Optionally, the access control apparatus further includes:

a generation module, configured to: when the authentication result indicates that authentication succeeds, generate a local authentication binding entry according to the authentication result, where the local authentication binding entry includes the IP address of the access device and the authentication information of the user.

Optionally, the access control apparatus further includes:

a third receiving module, configured to receive a VXLAN service packet, where the VXLAN service packet is obtained by encapsulating an IP service packet sent by the user;

a second parsing module, configured to parse the VXLAN service packet to obtain the IP service packet and an outer source IP address that is in a VXLAN header of the VXLAN service packet; and a processing module, configured to process the IP service packet according to the local authentication binding entry.

Optionally, the processing module is further configured to:

forward the IP service packet when the outer source IP address is the same as the IP address of the access device that is recorded in the local authentication binding entry; or forbid forwarding of the IP service packet when the outer source IP address is different from the IP address of the access device that is recorded in the local authentication binding entry.

Optionally, the sending module is further configured to:

generate an authentication packet that includes the IP address of the access device and the authentication information of the user; and send the authentication packet to the authentication server.

Optionally, the authentication server is a remote authentication dial-in user service RADIUS server, and an attribute 87 field of the authentication packet includes the IP address of the access device.

According to a third aspect, an access control system is provided, where the access control system includes a virtual extensible local area network VXLAN and an authentication server, and the VXLAN includes an access device and a service router; and the service router includes the access control apparatus according to the second aspect.

According to a fourth aspect, an access control apparatus is provided, applied to a virtual extensible local area network VXLAN, where the VXLAN further includes an access device, the access control apparatus includes at least one processor, at least one network interface, at least one memory, and at least one communications bus, the processor is configured to execute a program stored in the memory, and the program includes:

receiving a VXLAN request packet sent by the access device, where the VXLAN request packet is obtained by encapsulating an Internet Protocol IP request packet sent by a user, and the VXLAN request packet includes an IP address of the access device and authentication information of the user;

parsing the VXLAN request packet to obtain the IP address of the access device and the authentication information of the user;

sending the IP address of the access device and the authentication information of the user to an authentication server, so that the authentication server authenticates the user;

receiving an authentication result sent by the authentication server; and controlling the user according to the authentication result.

Optionally, the controlling the user according to the authentication result includes:

when the authentication result indicates that authentication succeeds, allowing the user to access a network; or when the authentication result indicates that authentication fails, forbidding the user to access a network.

Optionally, the program further includes:

when the authentication result indicates that authentication succeeds, generating a local authentication binding entry according to the authentication result, where the local authentication binding entry includes the IP address of the access device and the authentication information of the user.

Optionally, the program further includes:

receiving a VXLAN service packet, where the VXLAN service packet is obtained by encapsulating an IP service packet sent by the user;

parsing the VXLAN service packet to obtain the IP service packet and an outer source IP address that is in a VXLAN header of the VXLAN service packet; and processing the IP service packet according to the local authentication binding entry.

Optionally, the processing the IP service packet according to the local authentication binding entry includes:

forwarding the IP service packet when the outer source IP address is the same as the IP address of the access device that is recorded in the local authentication binding entry; or forbidding forwarding of the IP service packet when the outer source IP address is different from the IP address of the access device that is recorded in the local authentication binding entry.

Optionally, the sending the IP address of the access device and the authentication information of the user to an authentication server includes:

generating an authentication packet that includes the IP address of the access device and the authentication information of the user; and sending the authentication packet to the authentication server.

Optionally, the authentication server is a remote authentication dial-in user service RADIUS server, and an attribute 87 field of the authentication packet includes the IP address of the access device.

According to a fifth aspect, an access control system is provided, where the access control system includes a virtual extensible local area network VXLAN and an authentication server, and the VXLAN includes an access device and a service router; and the service router includes the access control apparatus according to the fourth aspect.

In conclusion, the present invention provides the access control method, apparatus, and system. In the access control method, the access device encapsulates the IP request packet sent by the user, to obtain the VXLAN request packet, and sends the VXLAN request packet to the service router. The service router parses the VXLAN request packet to obtain the IP address of the access device and the authentication information of the user, and then sends the IP address of the access device and the authentication information of the user to the authentication server for user authentication. Because each user corresponds to a unique access device in the VXLAN, the IP address of the access device corresponding to the user and the authentication information of the user that are used for authentication can be pre-configured in the authentication server, so as to authenticate the user according to access information of the user in a VXLAN scenario.

Further, when the authentication result indicates that authentication succeeds, the local authentication binding entry that includes the IP address of the access device and the authentication information of the user is generated according to the authentication result, so that after receiving the VXLAN service packet, the service router parses the VXLAN service packet to obtain the IP service packet and the outer source IP address (that is, the IP address of the access device that encapsulates the IP service packet) in the VXLAN service packet, and processes the IP service packet according to the local authentication binding entry. That is, whether the IP service packet is secure is determined by determining whether the outer source IP address is the same as the IP address of the access device that is recorded in the local authentication binding entry. When the outer source IP address is the same as the IP address of the access device that is recorded in the local authentication binding entry, the IP service packet is secure, and the IP service packet is forwarded. When the outer source IP address is different from the IP address of the access device that is recorded in the local authentication binding entry, the IP service packet is insecure, and forwarding of the IP service packet is forbidden. In this way, network security is ensured. In addition, because both an outer source IP address in the VXLAN request packet and the outer source IP address in the VXLAN service packet are added by the access device and cannot be tampered with by the user, reliability of both user authentication and security binding check is relatively high.

BRIEF DESCRIPTION OF THE DRAWINGS

To describe the technical solutions in the embodiments of the present invention more clearly, the following briefly describes the accompanying drawings required for describing the embodiments.

FIG. 4-1 is a flowchart of another access control method according to an embodiment of the present invention;

FIG. 4-2 is a schematic structural diagram of a VXLAN request packet according to an embodiment of the present invention;

FIG. 4-3 is a flowchart of a method for sending an IP service packet according to an embodiment of the present invention;

FIG. 5-1 is a schematic structural diagram of an access control apparatus according to an embodiment of the present invention;

FIG. 5-2 is a schematic structural diagram of another access control apparatus according to an embodiment of the present invention;

FIG. 5-3 is a schematic structural diagram of still another access control apparatus according to an embodiment of the present invention;

DESCRIPTION OF EMBODIMENTS

To make the objectives, technical solutions, and advantages of the present invention clearer, the following further describes the embodiments of the present invention in detail with reference to the accompanying drawings.

Figure 2:
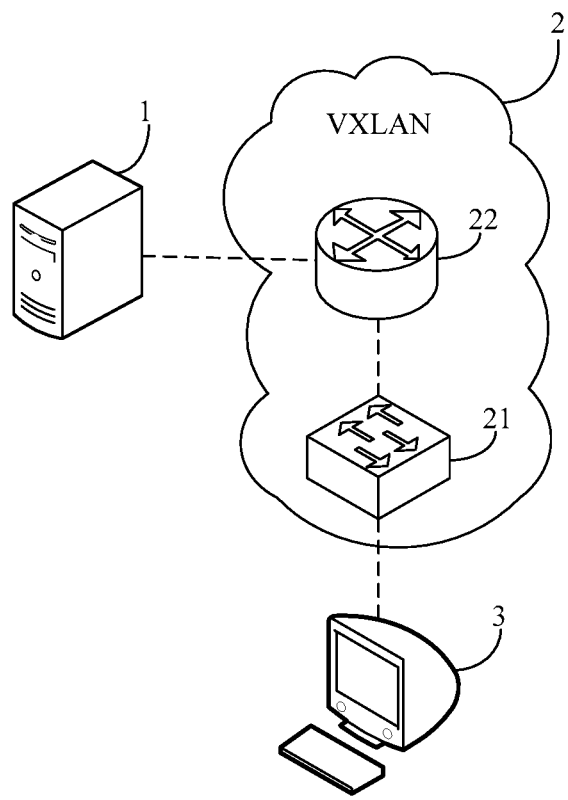
FIG. 2 is a schematic diagram of an application scenario of an access control method according to an embodiment of the present invention.

FIG. 2 is a schematic diagram of an application scenario of an access control method according to an embodiment of the present invention. As shown in FIG. 2, a VXLAN 2 includes an access device 21 and a service router 22. The access device 21 may be an access switch or an access router. The service router may be a broadband network gateway (BNG) or a broadband remote access server (BRAS), or another gateway having an authentication function. A user can login in to user equipment 3, the user equipment 3 connects to the access device 21, the access device 21 connects to the service router 22, and the service router 22 can connect to both an authentication server 1 and a network (not shown in FIG. 2). For example, the network may be a target network in which another user equipment communicating with the user equipment 3 is located, or a core network connected to the target network. The authentication server 1 may be a Remote Authentication Dial-in User Service (RADIUS) server.

Figure 3:
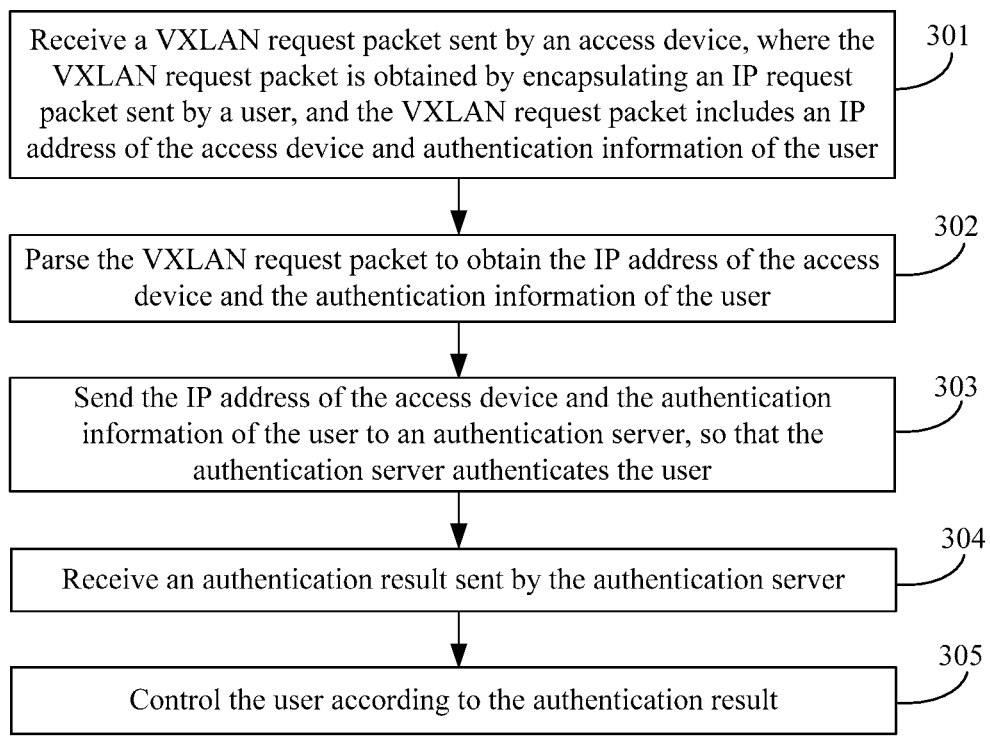
FIG. 3 is a flowchart of an access control method according to an embodiment of the present invention.

As shown in FIG. 3, an embodiment of the present invention provides an access control method. The access control method may be applied to the service router 22 in FIG. 2, and the access control method may include the following steps:

Step 301: Receive a VXLAN request packet sent by an access device, where the VXLAN request packet is obtained by encapsulating an IP request packet sent by a user, and the VXLAN request packet includes an IP address of the access device and authentication information of the user.

Step 302: Parse the VXLAN request packet to obtain the IP address of the access device and the authentication information of the user.

Step 303: Send the IP address of the access device and the authentication information of the user to an authentication server, so that the authentication server authenticates the user.

Step 304: Receive an authentication result sent by the authentication server.

Step 305: Control the user according to the authentication result.

Step 305 may include: when the authentication result indicates that authentication succeeds, allowing the user to access a network; or when the authentication result indicates that authentication fails, forbidding the user to access a network.

To implement the present invention, authentication rules need to be pre-configured in the authentication server. Each authentication rule includes an IP address of an access device and at least one type of user information, and the user information is information that can uniquely identify a user, for example, a user name or a password. In addition, each authentication rule may further include other information such as a VXLAN identifier of a user.

In conclusion, according to the access control method provided in this embodiment of the present invention, the access device encapsulates the IP request packet sent by the user, to obtain the VXLAN request packet, and sends the VXLAN request packet to the service router. The service router parses the VXLAN request packet to obtain the IP address of the access device and the authentication information of the user, and then sends the IP address of the access device and the authentication information of the user to the authentication server for user authentication. Because each user corresponds to a unique access device in the VXLAN, the IP address of the access device corresponding to the user and the authentication information of the user that are used for authentication can be pre-configured in the authentication server, so as to authenticate the user according to access information of the user in a VXLAN scenario.

Optionally, the access control method may further include:

when the authentication result indicates that authentication succeeds, generating a local authentication binding entry according to the authentication result, where the local authentication binding entry includes the IP address of the access device and the authentication information of the user.

Optionally, the access control method may further include:

receiving a VXLAN service packet, where the VXLAN service packet is obtained by encapsulating an IP service packet sent by the user;

parsing the VXLAN service packet to obtain the IP service packet and an outer source IP address that is in a VXLAN header of the VXLAN service packet; and processing the IP service packet according to the local authentication binding entry.

Optionally, the processing the IP service packet according to the local authentication binding entry includes:

forwarding the IP service packet when the outer source IP address is the same as the IP address of the access device that is recorded in the local authentication binding entry; or forbidding forwarding of the IP service packet when the outer source IP address is different from the IP address of the access device that is recorded in the local authentication binding entry.

Optionally, step 303 may include:

generating an authentication packet that includes the IP address of the access device and the authentication information of the user; and sending the authentication packet to the authentication server.

Optionally, the authentication server is a remote authentication dial-in user service RADIUS server, and an attribute 87 field of the authentication packet includes the IP address of the access device.

In conclusion, according to the access control method provided in this embodiment of the present invention, the access device encapsulates the IP request packet sent by the user, to obtain the VXLAN request packet, and sends the VXLAN request packet to the service router. The service router parses the VXLAN request packet to obtain the IP address of the access device and the authentication information of the user, and then sends the IP address of the access device and the authentication information of the user to the authentication server for user authentication. Because each user corresponds to a unique access device in the VXLAN, the IP address of the access device corresponding to the user and the authentication information of the user that are used for authentication can be pre-configured in the authentication server, so as to authenticate the user according to access information of the user in a VXLAN scenario.

Further, when the authentication result indicates that authentication succeeds, the local authentication binding entry that includes the IP address of the access device and the authentication information of the user is generated according to the authentication result, so that after receiving the VXLAN service packet, the service router parses the VXLAN service packet to obtain the IP service packet and the outer source IP address (that is, the IP address of the access device that encapsulates the IP service packet) in the VXLAN service packet, and processes the IP service packet according to the local authentication binding entry. That is, whether the IP service packet is secure is determined by determining whether the outer source IP address is the same as the IP address of the access device that is recorded in the local authentication binding entry. When the outer source IP address is the same as the IP address of the access device that is recorded in the local authentication binding entry, the IP service packet is secure, and the IP service packet is forwarded. When the outer source IP address is different from the IP address of the access device that is recorded in the local authentication binding entry, the IP service packet is insecure, and forwarding of the IP service packet is forbidden. In this way, network security is ensured. In addition, because both an outer source IP address in the VXLAN request packet and the outer source IP address in the VXLAN service packet are added by the access device and cannot be tampered with by the user, reliability of both user authentication and security binding check is relatively high.

Figure 1:
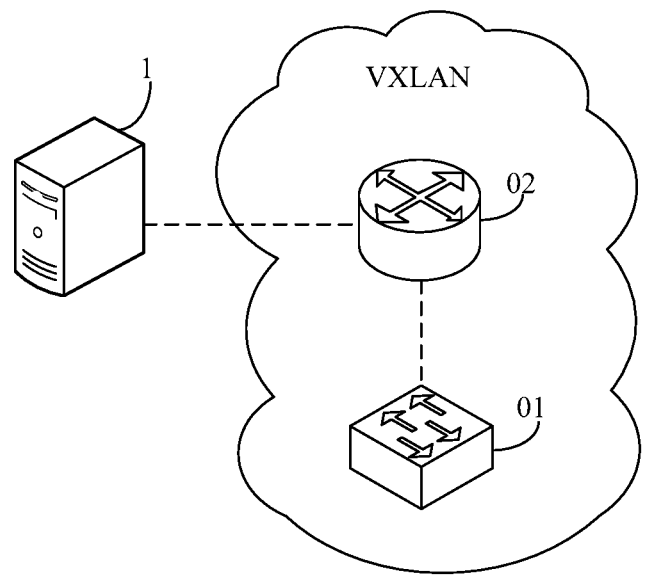
FIG. 1 is a schematic structural diagram of a VXLAN according to the prior art.
Figures 1, 4:
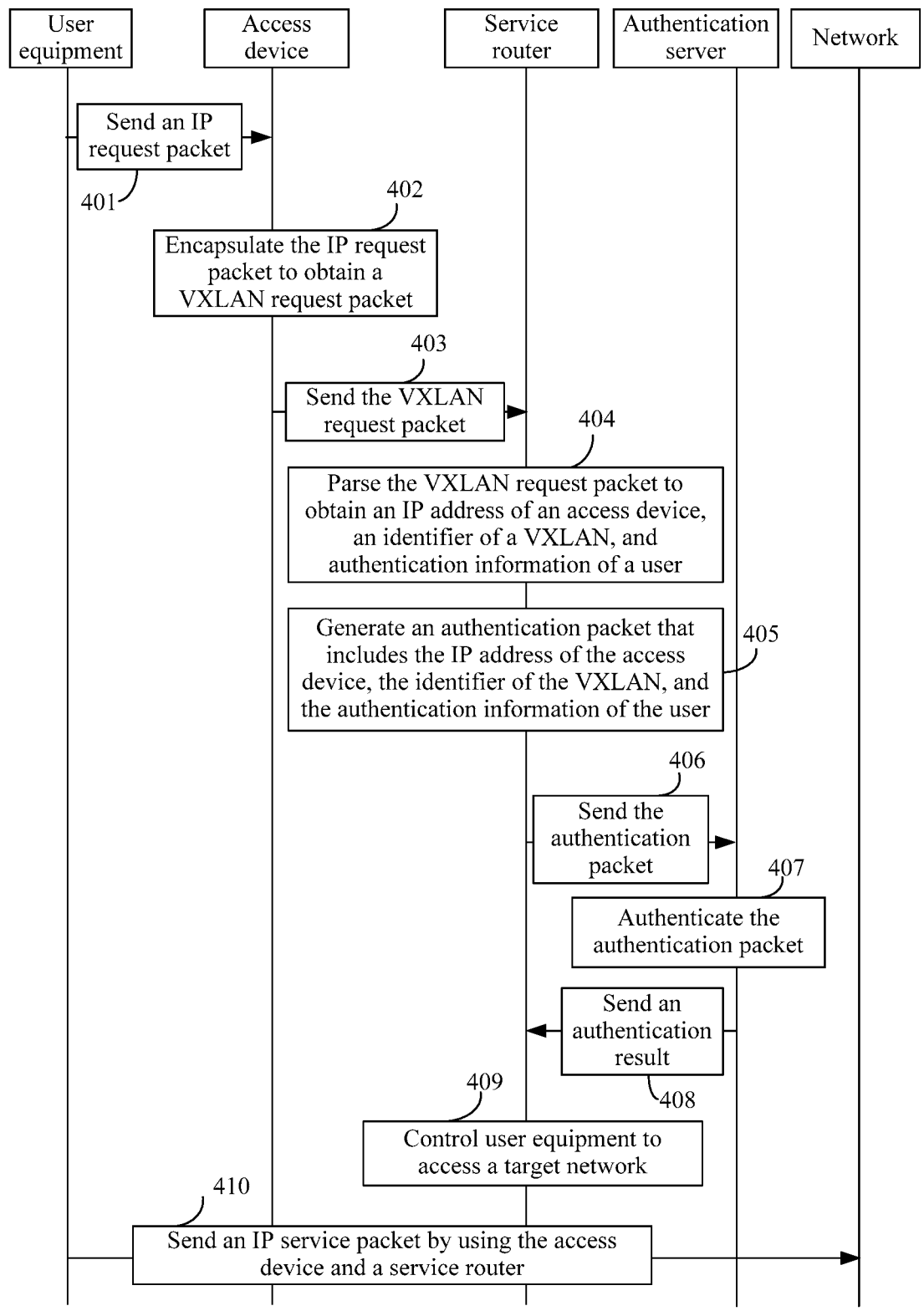
Figures 2, 4:
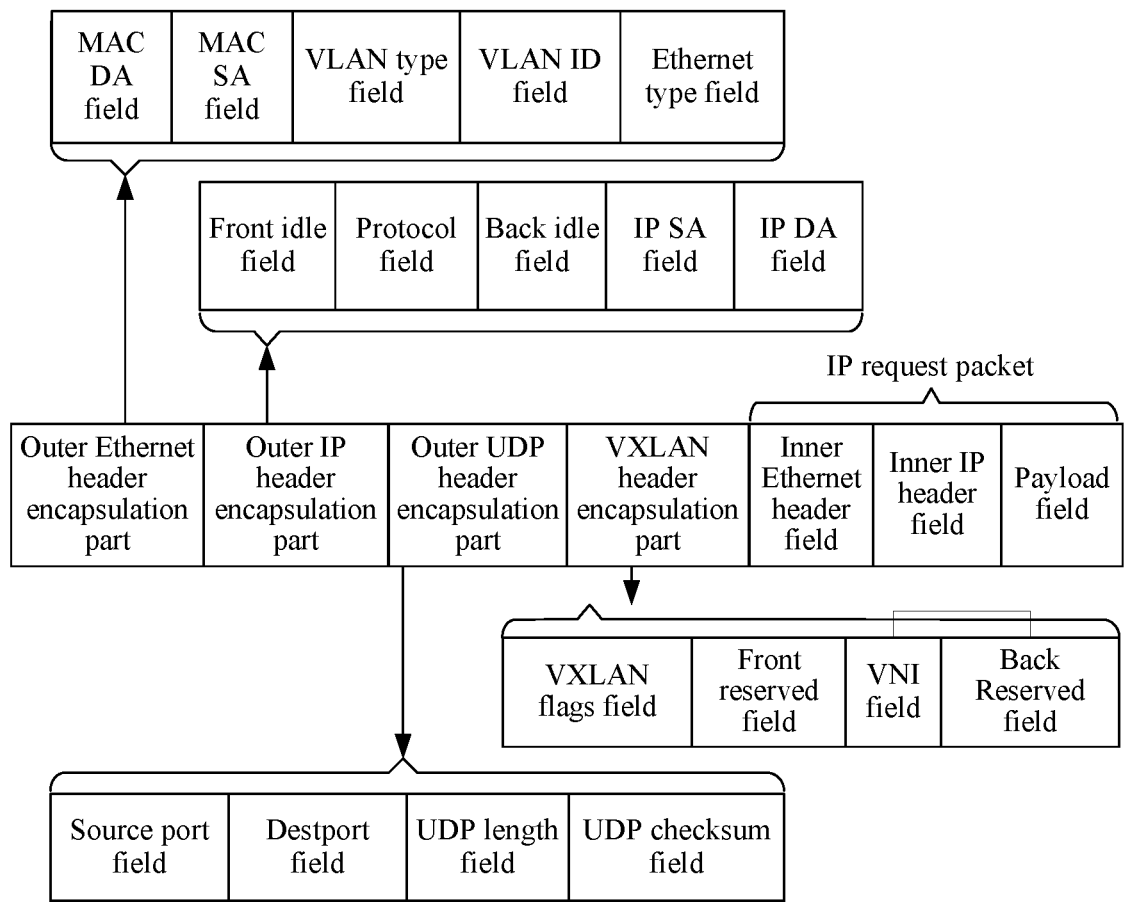
Figures 3, 4:
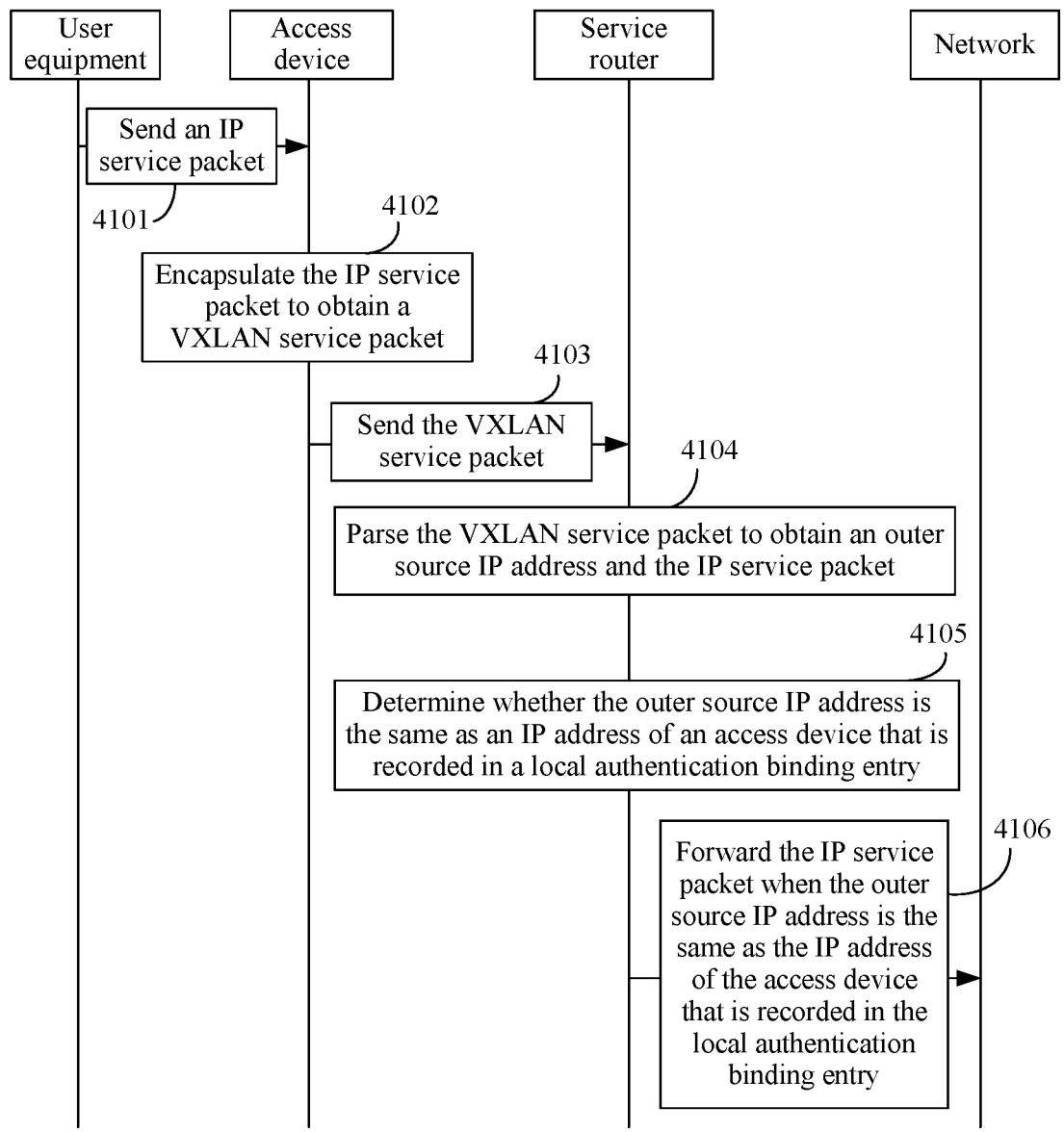

As shown in FIG. 4-1, an embodiment of the present invention provides another access control method. The access control method is described by using an example in which a user is an authorized user, and the access control method may include the following steps.

Step 401: User equipment sends an IP request packet to an access device.

The user equipment connects to the access device, the access device connects to a service router, and the service router can connect to both an authentication server and a network. For example, the network may be a target network in which another user equipment communicating with the user equipment is located, or a core network connected to the target network, and the target network may be the Internet.

The user may enter a user name and a password on the user equipment, so that the user equipment generates the IP request packet that includes authentication information (for example, the user name and the password) of the user, and sends the generated IP request packet to the access device to which the user equipment connects. For example, the user name and the password may be pre-allocated to the user. For a specific structure of the IP request packet generated by the user equipment, refer to a specific structure of an IP request packet generated by user equipment in a VLAN. Details are not described in this embodiment of the present invention.

Step 402: The access device encapsulates the IP request packet to obtain a VXLAN request packet.

After the access device receives the IP request packet sent by the user equipment, the access device may encapsulate the IP request packet by encapsulating a MAC address into a UDP packet, to obtain the VXLAN request packet. The VXLAN request packet may include an IP address of the access device, the authentication information (for example, the user name and the password) of the user, and an identifier of a VXLAN in which the access device is located.

FIG. 4-2 is a schematic structural diagram of a VXLAN request packet according to an embodiment of the present invention. As shown in FIG. 4-2, the VXLAN request packet may successively include an outer Ethernet header encapsulation part, an outer IP header encapsulation part, an outer UDP header encapsulation part, a VXLAN header encapsulation part, and the IP request packet.

The outer Ethernet header encapsulation part may successively include a destination MAC address (MAC DA) field, a source MAC address (MAC SA) field, a VLAN type field, a VLAN identifier (VLAN ID) field, and an Ethernet type field. The MAC DA field indicates a directly connected next-hop MAC address in a routing table on a VTEP to which a destination virtual machine belongs. The MAC SA field indicates a MAC address of a VTEP to which a virtual machine that sends the VXLAN request packet belongs. When the IP request packet carries a VLAN tag, a value of the VLAN type field is 0x8100. When a protocol packet corresponding to the Ethernet type field is an IP protocol packet, a value of the Ethernet type field is 0x0800.

The outer IP header encapsulation part may successively include a front idle field, a protocol field, a back idle field, a source IP address field, and a destination IP address field. The IP SA field indicates the IP address of the access device. The IP DA field indicates an IP address of the service router.

The outer UDP header encapsulation part may successively include a source port field, a destination port (destport) field, a UDP length field, and a UDP checksum field. A port number indicated by the destport field may be 4789, and a source port number indicated by the source port field may be obtained by calculating the IP request packet by using a hash algorithm.

The VXLAN header encapsulation part successively includes a VXLAN flags field, a front reserved field, a VXLAN identifier (VNI) field, and a back reserved field. The VNI field may include the identifier of the VXLAN in which the access device is located.

The IP request packet successively includes an inner Ethernet header field, an inner IP header field, and a valid payload field. The valid payload field includes the user name and the password that are entered by the user.

Step 403: The access device sends the VXLAN request packet to a service router.

After the access device encapsulates the IP request packet sent by the user equipment and obtains the VXLAN request packet, the access device may send, to the service router, the VXLAN request packet that includes the IP address of the access device, the VXLAN identifier, and the authentication information of the user.

Step 404: The service router parses the VXLAN request packet to obtain an IP address of the access device, an identifier of a VXLAN, and authentication information of a user.

After receiving the VXLAN request packet, the service router may parse the VXLAN request packet to obtain the IP address of the access device, the user name, the password, and the identifier of the VXLAN that are included in the VXLAN request packet. For example, the IP address of the access device is obtained from the outer IP header encapsulation part in the VXLAN request packet, the identifier of the VXLAN in which the access device is located is obtained from the VXLAN header encapsulation part in the VXLAN request packet, and the user name and the password are obtained from the IP request packet in the VXLAN request packet.

Step 405: The service router generates an authentication packet that includes the IP address of the access device, the identifier of the VXLAN, and the authentication information of the user.

For example, when the authentication server may be a RADIUS server, the service router may generate, according to the RADIUS protocol, the IP address of the access device, the user name, the password, and the identifier of the VXLAN, the authentication packet that includes the IP address of the access device, the user name, the password, and the identifier of the VXLAN. Specifically, for a specific structure of the generated authentication packet, refer to a specific structure of an authentication packet generated according to the RADIUS protocol in the prior art. For example, an attribute 87 field of the authentication packet may include the IP address of the access device, and the attribute 87 field may be a network attached storage port identifier (NAS-Port-Id) field.

Step 406: The service router sends the authentication packet to an authentication server.

Because the service router connects to the authentication server, the service router can send the authentication packet to the authentication server. The authentication server may be a RADIUS. It should be noted that the authentication server may be alternatively another authentication server except the RADIUS. This is not limited in this embodiment of the present invention.

Step 407: The authentication server authenticates the authentication packet.

Specifically, authentication rules may be pre-configured in the authentication server. Each authentication rule includes an IP address of an access device and at least one type of user information, and the user information is information that can uniquely identify a user, for example, a user name or a password. In addition, each authentication rule may further include other information such as a VXLAN identifier of a user. For example, an authentication entry used to record the authentication rule may be set in the authentication server.

The authentication entry may be shown in Table 1, and the authentication entry records two authentication rules. A first authentication rule includes ZHANGSAN (a user name), 110 (a password), A1 (an IP address of an access device), and VXLAN-B1 (an identifier of a VXLAN in which an access device is located). A second authentication rule includes LISI (a user name), 120 (a password), A2 (an IP address of an access device), and VXLAN-B2 (an identifier of a VXLAN in which an access device is located).

TABLE 1

| User name | Password | IP address of an access device | Identifier of a VXLAN in which an access device is located |
| --- | --- | --- | --- |
| ZHANGSAN | 110 | A1 | VXLAN-B1 |
| LISI | 120 | A2 | VXLAN-B2 |

After the authentication server receives the authentication packet, the authentication server can obtain the IP address of the access device, the user name, the password, and the identifier of the VXLAN that are in the authentication packet, and query, in the authentication entry in the authentication server, whether the authentication entry has an authentication rule that includes all of the IP address of the access device, the user name, the password, and the identifier of the VXLAN that are in the authentication packet. If the authentication entry has an authentication rule that includes all of the IP address of the access device, the user name, the password, and the identifier of the VXLAN that are in the authentication packet, the authentication server may determine that authentication succeeds, and generate a first packet used to indicate that an authentication result is that authentication succeeds. If the authentication entry does not have an authentication rule that includes all of the IP address of the access device, the user name, the password, and the identifier of the VXLAN that are in the authentication packet, the authentication server may determine that authentication fails, and generate a second packet used to indicate that an authentication result is that authentication fails.

Because the example in which the user is the authorized user is used in this embodiment of the present invention, the authentication entry in the authentication server has the authentication rule that includes all of the IP address of the access device, the user name, the password, and the identifier of the VXLAN that are in the authentication packet, and the authentication server may generate the first packet used to indicate that the authentication result is that authentication succeeds.

Step 408: The authentication server sends an authentication result to the service router.

After the authentication server authenticates the authentication packet, the authentication server may send the authentication result to the service router. For example, the authentication server may send, to the service router, the first packet used to indicate that the authentication result is that authentication succeeds.

Step 409: The service router controls the user equipment to access a target network.

Because the user in this embodiment of the present invention is the authorized user, the authentication result sent by the authentication server to the service router in step 408 indicates that authentication succeeds. The service router allows the user to access the network, and may control the user equipment to access the network, and notify the user that authentication succeeds and that the user equipment has accessed the network.

It should be noted that, if the authentication result indicates that authentication succeeds, after step 409, the service router may generate a local authentication binding entry according to the authentication result. The local authentication binding entry may include the IP address of the access device and the authentication information of the user that are authenticated. For example, the local authentication binding entry may be shown in Table 2. Table 2 records a correspondence between authentication information C1 of a first user and an IP address A1 of an access device, and a correspondence between authentication information C2 of a second user and an IP address A2 of an access device. Optionally, the authentication information C1 or C2 of the user in Table 2 may include information such as a user name, a password, and an IP address of a user.

TABLE 2

| Authentication information of a user | IP address of an access device |
|---|---|
| C1 | A1 |
| C2 | A2 |

Step 410: The user equipment sends an IP service packet to the network by using the access device and the service router.

After the service router controls the user equipment to access the network, the user equipment may generate the IP service packet, and send the IP service packet to the target network by using the access device and the service router.

As shown in FIG. 4-3, step 410 may include the following steps.

Step 4101: The user equipment sends the IP service packet to the access device.

After the user equipment accesses the network, the user equipment may generate the IP service packet according to a requirement, and send the generated IP service packet to the access device to which the user equipment connects. The IP service packet may include at least one type of authentication information of the user, and the at least one type of authentication information may include an IP address of the user. It should be noted that, for a specific structure of the IP service packet generated by the user equipment, refer to a specific structure of an IP service packet generated by user equipment in the prior art. Details are not described in this embodiment of the present invention.

Step 4102: The access device encapsulates the IP service packet to obtain a VXLAN service packet.

For example, after the access device receives the IP service packet sent by the user equipment, the access device may encapsulate the IP service packet by encapsulating a MAC address into the UDP, to obtain the VXLAN service packet. It should be noted that, for a specific manner of encapsulating the IP service packet by the access device in step 4102, refer to a specific manner of encapsulating the IP request packet by the access device in step 402. Details are not described in this embodiment of the present invention again.

Step 4103: The access device sends the VXLAN service packet to the service router.

After the access device encapsulates the IP service packet sent by the user equipment and obtains the VXLAN service packet, the access device may send the VXLAN service packet to the service router.

Step 4104: The service router parses the VXLAN service packet to obtain an outer source IP address and the IP service packet.

After receiving the VXLAN service packet, the service router may parse the VXLAN service packet to obtain information in the VXLAN service packet, for example, to obtain the outer source IP address from the outer IP header encapsulation part in the VXLAN service packet, and to obtain the IP address of the user from the IP service packet in the VXLAN service packet.

Step 4105: The service router determines whether the outer source IP address is the same as the IP address of the access device that is recorded in a local authentication binding entry.

In one aspect, the IP request packet sent by the user equipment to the access device in step 401 may include the IP address of the user, and in step 404, the service router may further obtain the IP address of the user by parsing the VXLAN request packet. After step 408, that is, after the authentication result received by the service router indicates that authentication succeeds, authentication information in the local authentication binding entry generated by the service router may include the IP address of the user.

In another aspect, the IP request packet sent by the user equipment to the access device in step 401 may not include the IP address of the user, and in step 404, the service router cannot obtain the IP address of the user by parsing the VXLAN request packet. In step 407, if authentication succeeds, the authentication server may allocate an IP address to the user. Specifically, the authentication result sent by the authentication server to the service router may include the IP address allocated to the user. In step 408, after the service router receives the authentication result, the service router may send the IP address allocated to the user to the user equipment, so that the IP service packet sent by the user equipment to the access device in step 4101 includes the IP address of the user. Further, the service router may further store the IP address allocated to the user in the authentication information in the local authentication binding entry.

In step 4105, the service router may search, according to the authentication information of the user (for example, the IP address of the user) in the IP service packet obtained by means of parsing in step 4104, the local authentication binding entry for an IP address that is of an access device and that corresponds to the IP address of the user, and determine whether the outer source IP address obtained by means of parsing in step 4104 is the same as the IP address of the access device in the local authentication binding entry. If the outer source IP address is the same as the IP address of the access device in the local authentication binding entry, the service router determines that the IP service packet in the VXLAN service packet is secure. If the outer source IP address is different from the IP address of the access device in the local authentication binding entry, the service router determines that the IP service packet in the VXLAN service packet is insecure.

Step 4106: The service router forwards the IP service packet to the network when the outer source IP address is the same as the IP address of the access device that is recorded in the local authentication binding entry.

If the outer source IP address is the same as the IP address of the access device that is recorded in the local authentication binding entry, the service router may determine that the IP service packet obtained by means of parsing is secure, and forward the IP service packet obtained by means of parsing to the network. For example, the service router may forward the IP service packet to the target network, or forward the IP service packet to the core network connected to the target network, so that the core network forwards the IP service packet to the target network.

If the user is an unauthorized user, the authentication result sent by the authentication server to the service router in step 408 indicates that authentication fails, and the service router may forbid the user to access the network, and notify the user that authentication fails.

It should be noted that, if the user is the unauthorized user, in one aspect, after the service router forbids the user to access the network, the unauthorized user can still control the user equipment to generate the IP service packet, and send the generated IP service packet to the access device. The access device encapsulates the IP service packet generated by the user equipment, to obtain the VXLAN service packet, and sends the VXLAN service packet to the service router. In another aspect, the user equipment may not generate the IP request packet in step 401, but directly generate the IP service packet, and send the generated IP service packet to the access device. The access device encapsulates the IP service packet to obtain the VXLAN service packet, and sends the VXLAN service packet to the service router.

After receiving the VXLAN service packet, the service router may parse the VXLAN service packet, and determine whether the outer source IP address is the same as the IP address of the access device that is recorded in the local authentication binding entry. Because the user is the unauthorized user, the outer source IP address is different from the IP address of the access device that is recorded in the local authentication binding entry. The service router may determine that the IP service packet in the VXLAN service packet is insecure, and forbid forwarding of the IP service packet. In this way, network security is ensured.

In the prior art, in a process of user authentication in a VLAN, an access device needs to add a DHCP option 82 or a PPPoE+ option into an IP request packet to determine physical location information of a user, and therefore, the process of user authentication is relatively complex. In the present invention, in an authentication process, the access device directly encapsulates the IP request packet sent by the user, the VXLAN request packet includes the IP address of the access device, and the IP address of the access device can indirectly reflect physical location information of the user. Therefore, the process of user authentication in the present invention is relatively simple. In addition, in the prior art, a user name and a password that are entered by the user are authenticated, and because the user name and the password can be tampered with by the user, reliability of user authentication is relatively low. In the present invention, the IP address of the access device is authenticated, and because the outer source IP address in the VXLAN request packet is added by the access device and cannot be tampered with by the user, reliability of user authentication is relatively high.

In conclusion, according to the access control method provided in this embodiment of the present invention, the access device encapsulates the IP request packet sent by the user, to obtain the VXLAN request packet, and sends the VXLAN request packet to the service router. The service router parses the VXLAN request packet to obtain the IP address of the access device and the authentication information of the user, and then sends the IP address of the access device and the authentication information of the user to the authentication server for user authentication. Because each user corresponds to a unique access device in the VXLAN, the IP address of the access device corresponding to the user and the authentication information of the user that are used for authentication can be pre-configured in the authentication server, so as to authenticate the user according to access information of the user in a VXLAN scenario.

Further, when the authentication result indicates that authentication succeeds, the local authentication binding entry that includes the IP address of the access device and the authentication information of the user is generated according to the authentication result, so that after receiving the VXLAN service packet, the service router parses the VXLAN service packet to obtain the IP service packet and the outer source IP address (that is, the IP address of the access device that encapsulates the IP service packet) in the VXLAN service packet, and processes the IP service packet according to the local authentication binding entry. That is, whether the IP service packet is secure is determined by determining whether the outer source IP address is the same as the IP address of the access device that is recorded in the local authentication binding entry. When the outer source IP address is the same as the IP address of the access device that is recorded in the local authentication binding entry, the IP service packet is secure, and the IP service packet is forwarded. When the outer source IP address is different from the IP address of the access device that is recorded in the local authentication binding entry, the IP service packet is insecure, and forwarding of the IP service packet is forbidden. In this way, network security is ensured. In addition, because both an outer source IP address in the VXLAN request packet and the outer source IP address in the VXLAN service packet are added by the access device and cannot be tampered with by the user, reliability of both user authentication and security binding check is relatively high.

Figures 1, 5:
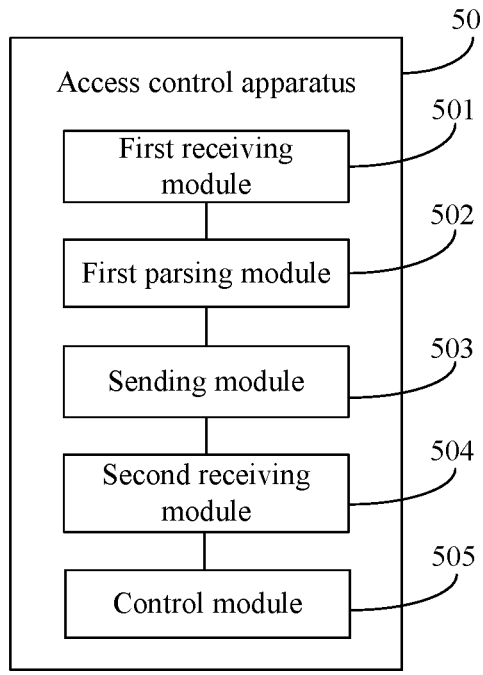
Figures 2, 5:
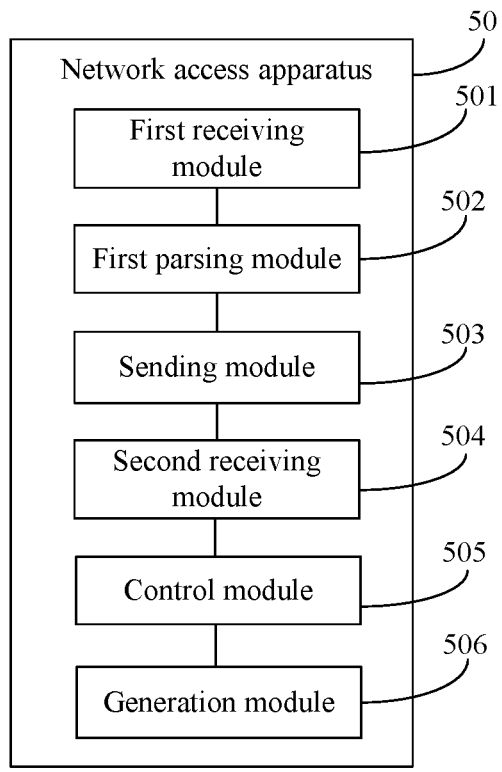
Figures 3, 5:
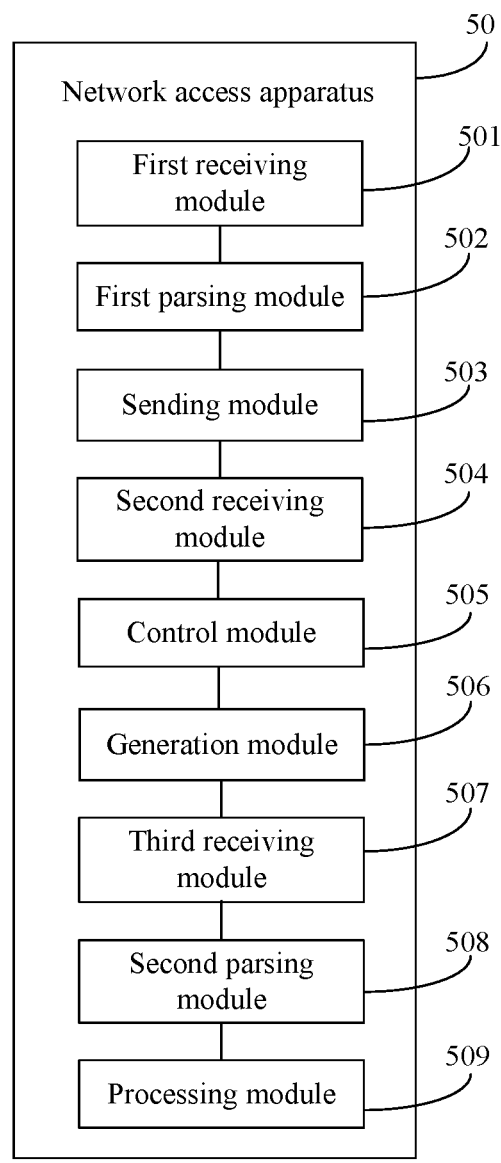

As shown in FIG. 5-1, an embodiment of the present invention provides an access control apparatus 50. The access control apparatus 50 may be applied to a VXLAN, the VXLAN may further include an access device, and the access control apparatus 50 may include:

a first receiving module 501, configured to receive a VXLAN request packet sent by the access device, where the VXLAN request packet is obtained by encapsulating an Internet Protocol IP request packet sent by a user, and the VXLAN request packet includes an IP address of the access device and authentication information of the user;

a first parsing module 502, configured to parse the VXLAN request packet to obtain the IP address of the access device and the authentication information of the user;

a sending module 503, configured to send the IP address of the access device and the authentication information of the user to an authentication server, so that the authentication server authenticates the user;

a second receiving module 504, configured to receive an authentication result sent by the authentication server; and a control module 505, configured to control the user according to the authentication result.

Optionally, the control module 505 may be further configured to:

when the authentication result indicates that authentication succeeds, allow the user to access a network; or when the authentication result indicates that authentication fails, forbid the user to access a network.

As shown in FIG. 5-2, based on FIG. 5-1, the access control apparatus 50 may further include:

a generation module 506, configured to: when the authentication result indicates that authentication succeeds, generate a local authentication binding entry according to the authentication result, where the local authentication binding entry includes the IP address of the access device and the authentication information of the user.

As shown in FIG. 5-3, based on FIG. 5-2, the access control apparatus 50 may include:

a first receiving module 501, configured to receive a VXLAN request packet sent by the access device, where the VXLAN request packet is obtained by encapsulating an Internet Protocol IP request packet sent by a user, and the VXLAN request packet includes an IP address of the access device and authentication information of the user;

a first parsing module 502, configured to parse the VXLAN request packet to obtain the IP address of the access device and the authentication information of the user;

a sending module 503, configured to send the IP address of the access device and the authentication information of the user to an authentication server, so that the authentication server authenticates the user;

a second receiving module 504, configured to receive an authentication result sent by the authentication server;

a control module 505, configured to control the user according to the authentication result;

a generation module 506, configured to: when the authentication result indicates that authentication succeeds, generate a local authentication binding entry according to the authentication result, where the local authentication binding entry includes the IP address of the access device and the authentication information of the user;

a third receiving module 507, configured to receive a VXLAN service packet, where the VXLAN service packet is obtained by encapsulating an IP service packet sent by the user;

a second parsing module 508, configured to parse the VXLAN service packet to obtain the IP service packet and an outer source IP address that is in a VXLAN header of the VXLAN service packet; and a processing module 509, configured to process the IP service packet according to the local authentication binding entry.

Optionally, the processing module 509 may be further configured to:

forward the IP service packet when the outer source IP address is the same as the IP address of the access device that is recorded in the local authentication binding entry; or forbid forwarding of the IP service packet when the outer source IP address is different from the IP address of the access device that is recorded in the local authentication binding entry.

Optionally, the sending module 503 may be further configured to:

generate an authentication packet that includes the IP address of the access device and the authentication information of the user; and send the authentication packet to the authentication server.

Optionally, the authentication server is a remote authentication dial-in user service RADIUS server, and an attribute 87 field of the authentication packet includes the IP address of the access device.

According to the access control apparatus provided in this embodiment of the present invention, the VXLAN request packet sent by the access device and received by the first receiving module includes the IP address of the access device and the authentication information of the user, so that the first parsing module obtains the IP address of the access device and the authentication information of the user by means of parsing, and then the sending module sends the IP address of the access device and the authentication information of the user to the authentication server for user authentication. Because each user corresponds to a unique access device in the VXLAN, the IP address of the access device corresponding to the user and the authentication information of the user that are used for authentication can be pre-configured in the authentication server, so as to authenticate the user according to access information of the user in a VXLAN scenario.

Further, when the authentication result indicates that authentication succeeds, the local authentication binding entry that includes the IP address of the access device and the authentication information of the user is generated according to the authentication result, so that after receiving the VXLAN service packet, the service router parses the VXLAN service packet to obtain the IP service packet and the outer source IP address (that is, the IP address of the access device that encapsulates the IP service packet) in the VXLAN service packet, and processes the IP service packet according to the local authentication binding entry. That is, whether the IP service packet is secure is determined by determining whether the outer source IP address is the same as the IP address of the access device that is recorded in the local authentication binding entry. When the outer source IP address is the same as the IP address of the access device that is recorded in the local authentication binding entry, the IP service packet is secure, and the IP service packet is forwarded. When the outer source IP address is different from the IP address of the access device that is recorded in the local authentication binding entry, the IP service packet is insecure, and forwarding of the IP service packet is forbidden. In this way, network security is ensured. In addition, because both an outer source IP address in the VXLAN request packet and the outer source IP address in the VXLAN service packet are added by the access device and cannot be tampered with by the user, reliability of both user authentication and security binding check is relatively high.

Figure 6:
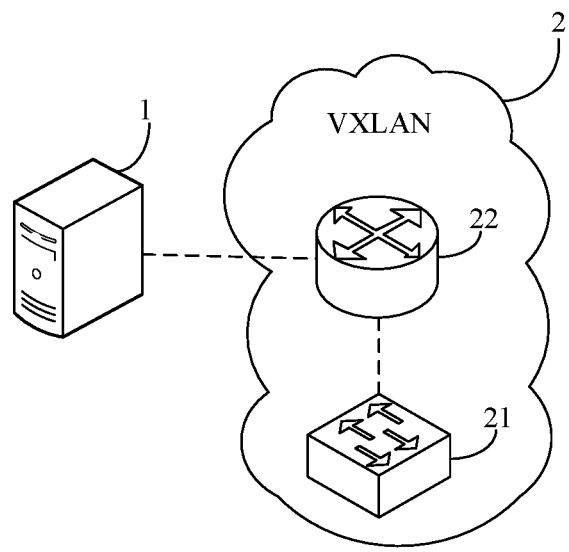
FIG. 6 is a schematic structural diagram of an access control system according to an embodiment of the present invention.

As shown in FIG. 6, an embodiment of the present invention provides an access control system 60. The access control system 60 may include a VXLAN 2 and an authentication server 1. The VXLAN 2 may include an access device 21 and a service router 22. The service router 22 may include the access control apparatus shown in FIG. 5-1, FIG. 5-2, or FIG. 5-3.

Figure 7:
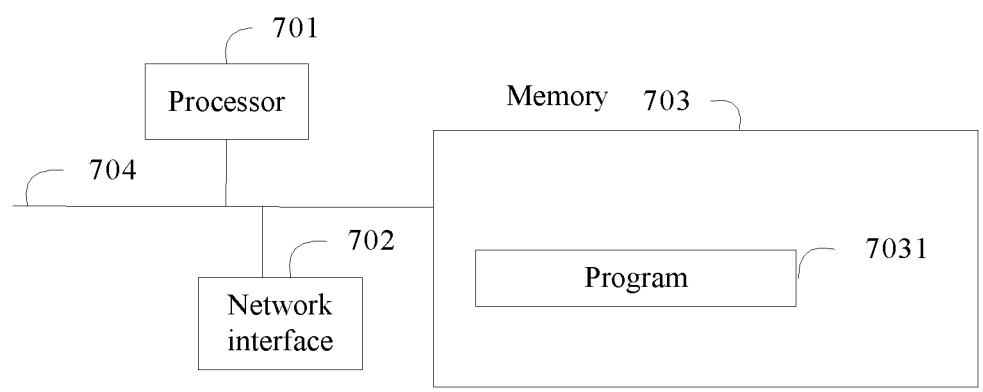
FIG. 7 is a schematic structural diagram of yet another access control apparatus according to an embodiment of the present invention.

FIG. 7 describes a structure of yet another access control apparatus according to an embodiment of the present invention. The access control apparatus may be applied to a VXLAN, the VXLAN further includes an access device, and the access control apparatus includes at least one processor 701 (for example, a CPU), at least one network interface 702 or another communications interface, a memory 703, and at least one communications bus 704 configured to implement communication between these components. The processor 701 is configured to execute an executable module stored in the memory 703, for example, a computer program. The memory 703 may include a high-speed random access memory (RAM), or may include a non-volatile memory, for example, at least one magnetic disk storage. Communication between the access control apparatus and at least one another network element may be implemented by using the at least one network interface 702 (which may be wired or wireless), for example, by using the Internet, a wide area network, a local area network, a metropolitan area network, or the like.

In some implementations, the memory 703 stores a program 7031, and the program 7031 may be executed by the processor 701 to implement the method shown in FIG. 3 or FIG. 4-1.

It should be noted that sequential order of steps of the access control method provided in the embodiments of the present invention may be properly adjusted, and a step may be correspondingly added or deleted according to a situation. Any variation readily figured out by a person skilled in the art within the technical scope disclosed in the present invention shall fall within the protection scope of the present invention, and details are not described herein.

It may be clearly understood by a person skilled in the art that, for the purpose of convenient and brief description, for a detailed working process of the foregoing access control apparatus and access control system, reference may be made to a corresponding process in the foregoing embodiments of the access control method, and details are not described herein again.

The foregoing descriptions are merely examples of the embodiments of the present invention, but are not intended to limit the present invention. Any modification, equivalent replacement, or improvement made without departing from the principle of the present invention should fall within the protection scope of the present invention.

What is claimed is:

1. An access control method, applied to a service router in a virtual extensible local area network (VXLAN), and the method comprises:
   receiving, by the service router, a VXLAN request packet sent by an access device over a routing path configured under an equal-cost multi-path routing (ECMP) strategy, wherein the VXLAN request packet is obtained by encapsulating an Internet Protocol (IP) request packet sent by a user, and the VXLAN request packet comprises authentication information of the user, and a VXLAN header of the VXLAN request packet comprises an IP address of the access device;
   parsing, by the service router, the VXLAN request packet to obtain the IP address of the access device and the authentication information of the user;
   sending, by the service router, the IP address of the access device and the authentication information of the user to an authentication server, so that the authentication server authenticates the user;
   receiving, by the service router, an authentication result sent by the authentication server;
   controlling, by the service router, the user according to the authentication result, and
   when the authentication result indicates that authentication succeeds, generating a local authentication binding entry according to the authentication result, wherein the local authentication binding entry comprises the IP address of the access device and the authentication information of the user.

2. The method according to claim 1, wherein the controlling the user according to the authentication result comprises:
   when the authentication result indicates that authentication succeeds, allowing the user to access a network; or
   when the authentication result indicates that authentication fails, forbidding the user to access a network.

3. The method according to claim 1, wherein the method further comprises:
   receiving a VXLAN service packet, wherein the VXLAN service packet is obtained by encapsulating an IP service packet sent by the user;
   parsing the VXLAN service packet to obtain the IP service packet and an outer source IP address that is in a VXLAN header of the VXLAN service packet; and
   processing the IP service packet according to the local authentication binding entry.

4. The method according to claim 3, wherein the processing the IP service packet according to the local authentication binding entry comprises:
   forwarding the IP service packet when the outer source IP address is the same as the IP address of the access device that is recorded in the local authentication binding entry; or
   forbidding forwarding of the IP service packet when the outer source IP address is different from the IP address of the access device that is recorded in the local authentication binding entry.

5. The method according to claim 1, wherein the sending the IP address of the access device and the authentication information of the user to an authentication server comprises:
   generating an authentication packet that comprises the IP address of the access device and the authentication information of the user; and
   sending the authentication packet to the authentication server.

6. The method according to claim 5, wherein the authentication server is a remote authentication dial-in user service RADIUS server, and
   an attribute 87 field of the authentication packet comprises the IP address of the access device.

7. An access control apparatus, applied to a virtual extensible local area network (VXLAN), and the access control apparatus comprises:
   a memory configured to store instructions;
   a processor configured to execute the instructions to:
   receive a VXLAN request packet sent by an access device over a routing path configured under an equal-cost multi-path routing (ECMP) strategy, wherein the VXLAN request packet is obtained by encapsulating an Internet Protocol (IP) request packet sent by a user, and the VXLAN request packet comprises authentication information of the user, and a VXLAN header of the VXLAN request packet comprises an IP address of the access device;
   parse the VXLAN request packet to obtain the IP address of the access device and the authentication information of the user;
   send the IP address of the access device and the authentication information of the user to an authentication server, so that the authentication server authenticates the user;
   receive an authentication result sent by the authentication server;
   control the user according to the authentication result, and
   when the authentication result indicates that authentication succeeds, generate a local authentication binding entry according to the authentication result, wherein the local authentication binding entry comprises the IP address of the access device and the authentication information of the user.

8. The access control apparatus according to claim 7, wherein the processor configured to execute the instructions to:
   when the authentication result indicates that authentication succeeds, allow the user to access a network; or
   when the authentication result indicates that authentication fails, forbid the user to access a network.

9. The access control apparatus according to claim 7, wherein the processor configured to execute the instructions to:
   receive a VXLAN service packet, wherein the VXLAN service packet is obtained by encapsulating an IP service packet sent by the user;
   parse the VXLAN service packet to obtain the IP service packet and an outer source IP address that is in a VXLAN header of the VXLAN service packet; and
   process the IP service packet according to the local authentication binding entry.

10. The access control apparatus according to claim 9, wherein the processor configured to execute the instructions to:
    forward the IP service packet when the outer source IP address is the same as the IP address of the access device that is recorded in the local authentication binding entry; or
    forbid forwarding of the IP service packet when the outer source IP address is different from the IP address of the access device that is recorded in the local authentication binding entry.

11. The access control apparatus according to claim 7, wherein the processor configured to execute the instructions to:
- generate an authentication packet that comprises the IP address of the access device and the authentication information of the user; and
- send the authentication packet to the authentication server.

12. The access control apparatus according to claim 11, wherein the authentication server is a remote authentication dial-in user service RADIUS server, and an attribute 87 field of the authentication packet comprises the IP address of the access device.

13. An access control system, wherein the access control system comprises a virtual extensible local area network (VXLAN) and an authentication server, and the VXLAN comprises an access device and a service router; and
the service router is configured to:
- receive a VXLAN request packet sent by the access device over a routing path configured under an equal-cost multi-path routing (ECMP) strategy, wherein the VXLAN request packet is obtained by encapsulating an Internet Protocol (IP) request packet sent by a user, and the VXLAN request packet comprises authentication information of the user, and a VXLAN header of the VXLAN request packet comprises an IP address of the access device;
- parse the VXLAN request packet to obtain the IP address of the access device and the authentication information of the user;
- send the IP address of the access device and the authentication information of the user to an authentication server, so that the authentication server authenticates the user;
- receive an authentication result sent by the authentication server;
- control the user according to the authentication result, and when the authentication result indicates that authentication succeeds, generate a local authentication binding entry according to the authentication result, wherein the local authentication binding entry comprises the IP address of the access device and the authentication information of the user.

14. The access control system according to claim 13, wherein the service router is configured to:
- when the authentication result indicates that authentication succeeds, allow the user to access a network; or
- when the authentication result indicates that authentication fails, forbid the user to access a network.

15. The access control system according to claim 13, wherein the service router is configured to:
- receive a VXLAN service packet, wherein the VXLAN service packet is obtained by encapsulating an IP service packet sent by the user;
- parse the VXLAN service packet to obtain the IP service packet and an outer source IP address that is in a VXLAN header of the VXLAN service packet; and
- process the IP service packet according to the local authentication binding entry.

16. The access control system according to claim 15, wherein the service router is configured to:
- forward the IP service packet when the outer source IP address is the same as the IP address of the access device that is recorded in the local authentication binding entry; or
- forbid forwarding of the IP service packet when the outer source IP address is different from the IP address of the access device that is recorded in the local authentication binding entry.

17. The access control system according to claim 13, wherein the service router is configured to:
- generate an authentication packet that comprises the IP address of the access device and the authentication information of the user; and
- send the authentication packet to the authentication server.

* * * * *